United States Patent [19]

Ng et al.

[11] Patent Number: 5,420,909
[45] Date of Patent: May 30, 1995

[54] METHOD FOR ALLOCATING TELEPHONE AND COMMUNICATION RESOURCES

[75] Inventors: Richard Ng, Palatine; Vijay Nadkarni, Naperville, both of Ill.

[73] Assignee: Motorola, Inc., Schaumburg, Ill.

[21] Appl. No.: 81,935

[22] Filed: Jun. 23, 1993

[51] Int. Cl.⁶ .......................................... H04M 11/00
[52] U.S. Cl. .................................. 379/58; 455/53.1; 455/34.1
[58] Field of Search .......................... 379/62, 63, 58; 455/34.1, 34.2, 15, 17, 53.1

[56] References Cited

U.S. PATENT DOCUMENTS

| | | | |
|---|---|---|---|
| 5,025,254 | 6/1991 | Hess | 455/34.1 |
| 5,034,993 | 7/1991 | Sasuta et al. | 455/34.1 |
| 5,218,354 | 6/1993 | Hess | 455/34.1 |

*Primary Examiner*—Curtis Kuntz
*Assistant Examiner*—Michael B. Chernoff
*Attorney, Agent, or Firm*—Timothy W. Markison

[57] ABSTRACT

A method for optimizing allocation of telephone and communication resources in a trunked communication system (100) is accomplished in the following manner. Upon receiving a resource request, a communication resource allocator, determines whether the request is for a communication resource (trunking call) or for a telephone resource (telephone call). When the request is for a communication resource, the communication resource allocator, allocates a communication resource from a broadcast unit in a second set of broadcast units. If no communication resources are available in the second set of broadcast units, the communication resource allocator allocates a communication resource from a broadcast unit of a first set of broadcast units in a predetermined order, wherein the broadcast units in the first set are affiliated with a telephone resource and a communication resource.

12 Claims, 2 Drawing Sheets

METHOD FOR ALLOCATING TELEPHONE AND COMMUNICATION RESOURCES

TECHNICAL FIELD

This invention relates generally to communication systems, and more particularly to telephone interconnections for trunked radio communication systems.

BACKGROUND OF THE INVENTION

A trunked communication system may be equipped with telephone interconnections to provide communication units with access to a Public Switched Telephone Network (PSTN) or Private Branch Exchange (PBX). To accomplish this, some broadcast units in the trunked communication system, support communication resources and telephone resources (interconnection repeaters), while other broadcast units support only communication resources (non-interconnection repeaters).

The types of telephone interconnection used are either matrixed or non-matrixed telephone interconnections. A matrixed telephone interconnection system can route any number (n) of telephone resources (i.e., phone lines) to any of the interconnection repeaters (m) in the system; thus forming an n*m full matrixed system. In a non-matrixed telephone interconnection system, a single phone line is directly coupled to an interconnection repeater. If the repeater is supporting a communication resource for a trunking communication, the repeater does not reroute the phone line audio to another repeater, and thus the telephone resource request goes unanswered. This is a major difference between a non-matrixed and matrixed telephone interconnection system.

Presently, in a non-matrixed telephone interconnection trunked system, an interconnection repeater handles telephone resource requests (interconnection calls) originating from a landline telephone using the directly coupled telephone resource. If this interconnection repeater does not have an available phone line, the user of the landline telephone must hang-up, request another interconnection repeater, and continue this process until an available interconnection repeater is found. Although suitable for some situations, the present technology is not suitable for all situations. There is a possibility for a landline telephone user to wait indefinitely before locating a free interconnection repeater. This wait time will depend on such variables as: the number of repeaters in the system, the length of time the repeaters are occupied, and the quickness with which the landline user can attempt to access a repeater once it becomes available. For these reasons, the present technology is typically limiting since interconnection calls cannot be transferred to an available interconnection repeater as quickly and efficiently as many users desire.

This problem is intensified when the trunked system is allocating a communication resource to a communication unit for a trunking communication, in that a central controller allocates an available communication resource from a broadcast unit in a round robin fashion of all the broadcast units. If the broadcast unit selected is an interconnection repeater, this repeater cannot support a telephone call until the trunking call is completed. This becomes inefficient when several telephone requests are waiting for an interconnection repeater while there is a non-interconnection repeater with an available communication resource that could have supported the trunking call. Thus, trunking calls and telephone calls are contending for the interconnection repeaters when contention is not necessary.

Therefore, a need exists for a method that optimizes allocation of telephone resources and communication resources with minimal resource contention.

DESCRIPTION OF A PREFERRED EMBODIMENT

Generally, the present invention is used within a communication system and provides a method for more efficient allocation of telephone resources and communication resources. To achieve this, a plurality of broadcast units, which support trunking calls and/or telephone calls via the telephone and communications resources, is divided into two sets; the first set supports both telephone calls and trunking calls, while the second set supports only thinking calls. When a request for a trunking call is received, a communication resource allocator determines whether any broadcast units of the second set have an available communication resource. When a broadcast unit does, the communication resource allocator allocates the communication resource via the broadcast unit for the requested trunking call. However, when all the broadcast units in the second set are busy, the communication resource allocator determines whether any broadcast units in the first set have an available communication resource and allocates the available communication resource to the trunking call. Thus, the broadcast units in the first set, which may be interconnection repeaters, are addressed for allocation of a communication resource only when all the broadcast units in the second set, which may be non-interconnection repeaters, are busy. This reduces resource contention between the broadcast units in the first set and the broadcast units in the second set.

Figure 1:
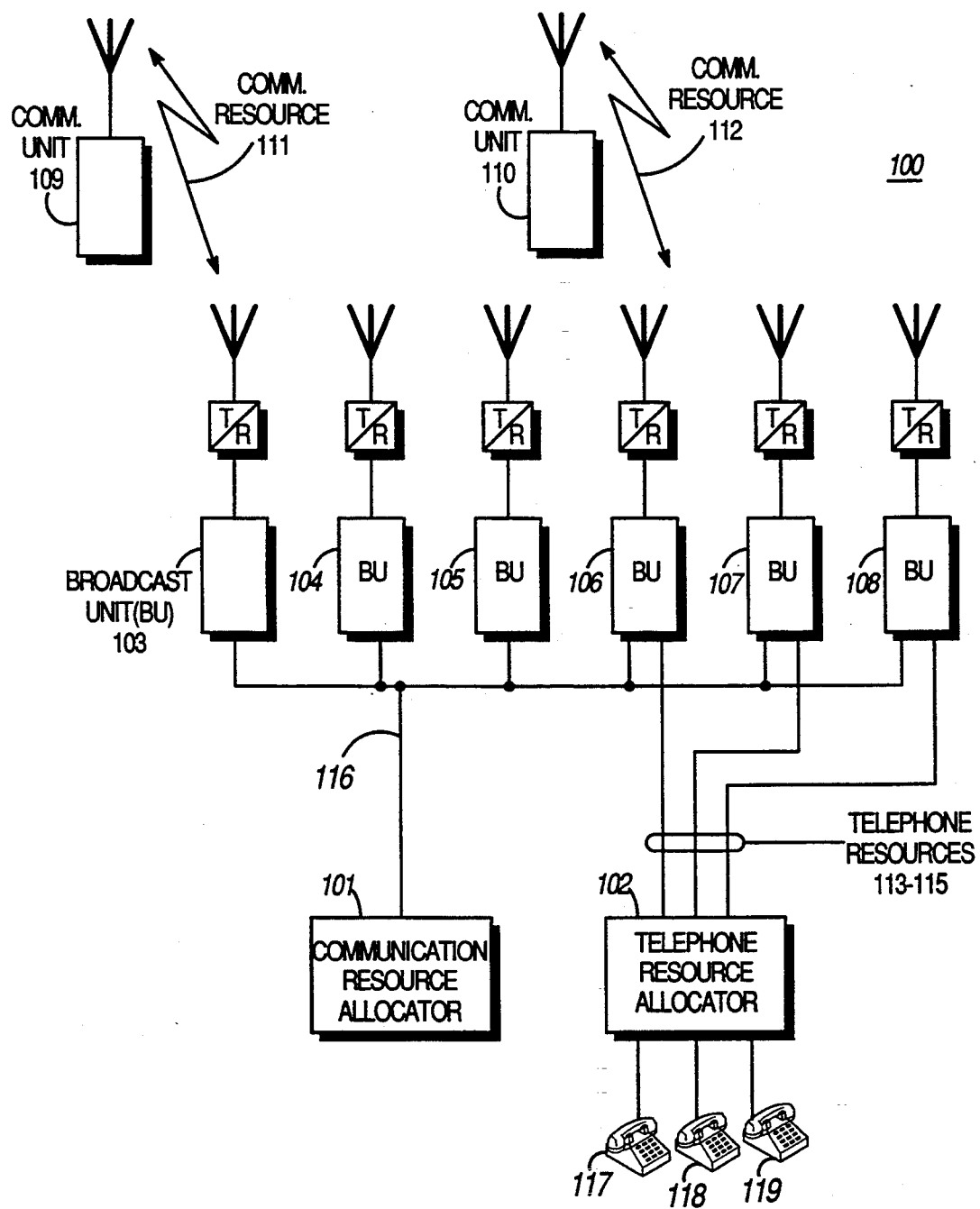
FIG. 1 illustrates a block diagram of a trunked communication system in accordance with the invention.

The present invention can be more fully described with reference to FIGS. 1 and 2. FIG. 1 illustrates a trunking communication system 100 that includes a communication resource allocator 101, a plurality of broadcast units 103–108, a plurality of communication units 109–110, communication resources 111–112, and telephone resources 113–115. The trunking communication system 100 also connects to a telephone resource allocator 102 via the telephone resources 113–115. The communication resource allocator 101 may be a centralized call processing controller or it may be a network of controllers distributed in the broadcast units 103–108 that work together to establish communication paths for the communication units 109–110. The communication resource allocator 101, if centralized, operably couples to each broadcast unit via an external control link 116. This control link may be a multi-drop link, as shown in FIG. 1, or it may be a point-to-point link to each broadcast unit.

The broadcast units 103–108, which may be repeaters or base station transceivers (i.e., a receiver and transmitter), are divided into a first set of broadcast units 106–108 and a second set of broadcast units 103–105. Each broadcast unit within the first set couples to a telephone resource 113–115 and the communication resource allocator 101. This allows the broadcast units 106–108 to support both trunking communications and telephone communications. The telephone resources, which normally are standard 2-wire telephone subscriber lines, are coupled to each of the broadcast units in the first set, for example, by using a IntelliRepeater Phone Interconnect Board manufactured by Motorola. This device operably links to the communication resource allocator 101 and allows control and monitoring of the connected telephone line resource 113–115, such as on- and off-hook control, and ring detection.

A thinking communication is typically a communication between two or more communication units 109–110, over a communication resource or channel 111–112 that a broadcast unit 103–108 supports. The communication channels may be time division multiplex (TDM) slots, carrier frequencies, pairs of carrier frequencies or other radio frequency (RF) transmission medium. (Note that one or more of the communication channels may be designated as a control channel such that communication units may communicate with a system controller to request and receive system resources.) A telephone communication is communication between at least one communication unit 109–110 in a thinking communication system and at least one landline telephone user 117–119 external to the trunking communication system. The telephone communication can originate from a communication unit, which is known as a mobile-to-landline communication, or from a landline user, which is known as a landline-to-mobile communication.

When one of the broadcast units 106–108 is supporting a trunking communication, it cannot support a landline call request from its connected telephone line resource. Since the telephone resource allocator 102 assigns telephone line resources 113–115 independently from the communication resource allocator 101, the telephone resource allocator does not know that the coupled broadcast unit is busy supporting a trunking communication. However, when one of the broadcast units 106–108 is supporting a telephone communication, the telephone resource allocator 102 knows this via an off-hook signal and therefore does not assign it.

The telephone resource allocator 102 may be part of the Public Switched Telephone Network (PSTN) in a Central Office, or a public or privately owned Private Branch Exchange (PBX). The telephone resource allocator 102 processes telephone resource allocation when a resource request comes from a typical landline telephone 117–119. The telephone line resources 113–115, if from the PSTN, are typically grouped by the Central Office as business lines and can be programmed in a hunt sequence such that a landline telephone user who desires a telephone resource only needs to dial one telephone number. If one of the group of telephone lines is supporting a communication or is not answering after a programmed number of rings, it automatically signals by ringing the next telephone line that is programmed in the hunt sequence. The hunting sequence is typically programmed to be repetitive so that it continues in a circular fashion until the landline telephone user either answers the call or hangs up. This feature is commonly known as a Centrex feature and is also available in most PBXs.

Figure 2:
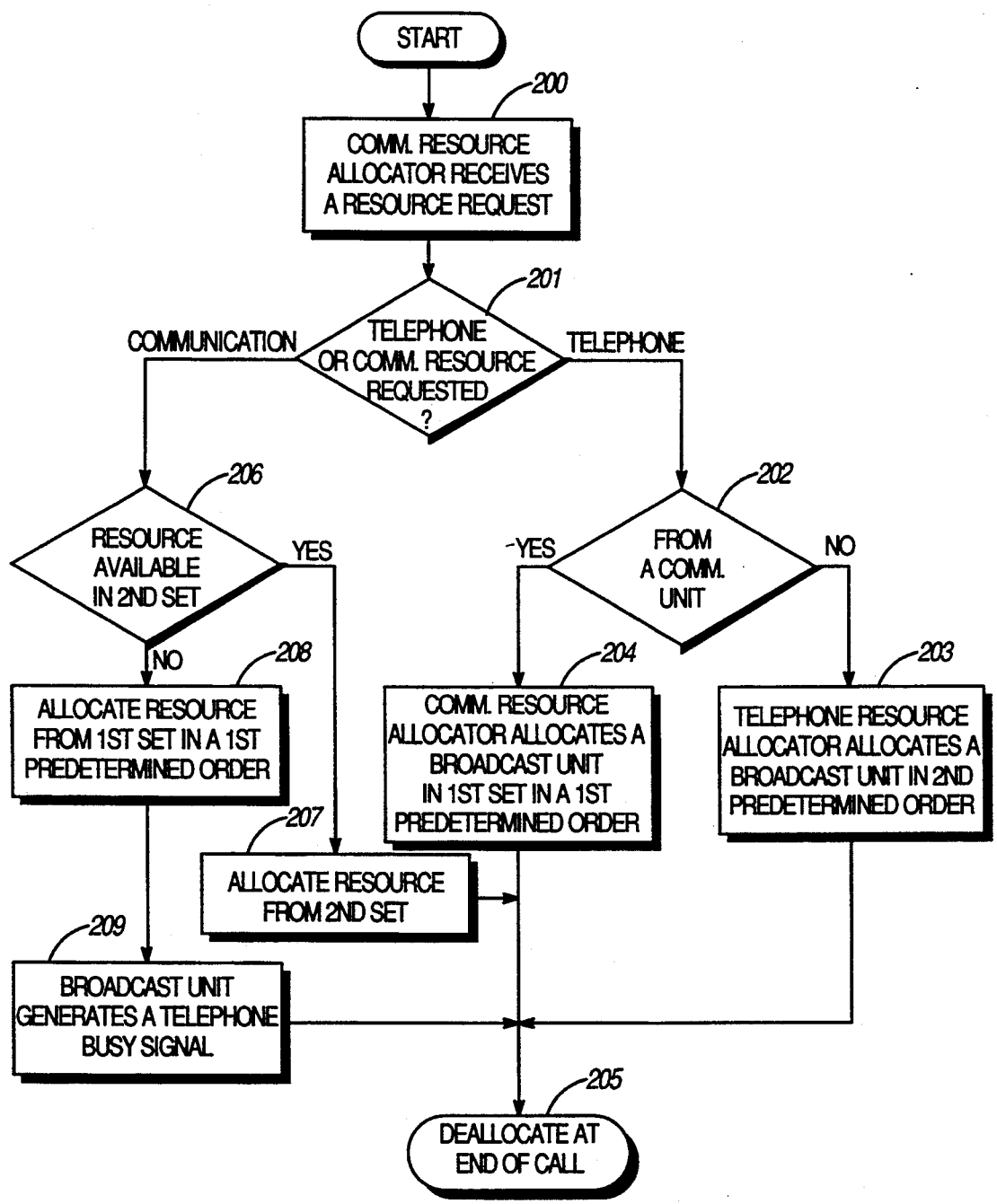
FIG. 2 illustrates a flow chart of a resource allocation process in accordance with the invention.

FIG. 2 illustrates a flow chart that a communication system may incorporate to implement the present invention. At step 200, the communication resource allocator receives a resource request from a communication unit or from a landline telephone. A communication unit typically transmits a request as a data message to the communication allocator on a control channel of the trunking communication system. A landline telephone user indicates a request to the communication resource allocator by a particular type of signaling, such as ringing voltage, that the telephone resource allocator sends on one of the telephone line resources.

The communication resource allocator determines in step 201 if the request is a trunking communication request or a telephone communication request. If the request is for a telephone communication, the communication resource allocator determines if it is from a communication unit or a landline telephone 202. If the request is from a landline telephone, the telephone resource allocator processes the request and, assigns a telephone line resource in a second predetermined order 203. The telephone resource allocator typically assigns, in this second predetermined order, the first non-busy telephone line resource in a pre-programmed circular hunt sequence. That is, each non-busy telephone line is assigned starting from the first in the sequence to the last and then returning to the first again, in a circular fashion. If all telephone line resources are busy, the landline telephone receives busy tones and the telephone resource allocator does not assign any resources. To alert the communication resource allocator of the allocated telephone resource, the telephone resource allocator sends signals, such as ringing voltage, on the assigned telephone line resources. Upon detecting the signals, the communication resource allocator assigns a broadcast unit for the telephone communication.

If the telephone request is from a communication unit 202, the communication resource allocator allocates a broadcast unit in the first set, in a first predetermined order, 204. The first predetermined order is an order that derives from the second predetermined order to minimize contention between a communication unit telephone request (mobile-to-landline) and a landline user request (landline-to-mobile). For example, if the telephone resource allocator assigns landline telephone requests in a second predetermined order that is sequential beginning with telephone line resource 115 to 113, (see FIG. 1) corresponding to broadcast unit 108 to 106 respectively, the communication resource allocator 101 shall assign a broadcast unit 106–108 to a communication unit that is requesting a telephone resource in the opposite order, 106 to 108. When the telephone call ends, the communication resource allocator deallocates the assigned broadcast unit, 205.

If the request is for a thinking communication 201, the communication resource allocator determines if a trunking communication resource is available from the second set of broadcast units 206. If a communication resource is available in the second set of broadcast units, the communication resource allocator allocates a trunking communication resource from the available communication resource 207. When the trunking call ends, the communication resource allocator deallocates the communication resource 205.

When, in step 206, a communication resource is not available from the second set of broadcast units 103–105, the communication resource allocator allocates a communication resource from the first set of broadcast units in the first predetermined order. The first predetermined order, as discussed above, is an order that arranges from the second predetermined order to minimize contention between a trunking communication unit request and a telephone communication request from a landline telephone. Next, the broadcast unit that is allocated in step 208 for a trunking communication generates a telephone busy signal 209. The busy signal is required to prevent the telephone resource allocator from allocating the telephone resource that couples to the broadcast unit already assigned for a trunked communication. An example of generating a busy signal on the telephone line resource is to temporarily go off-hook on the telephone line for the duration of the trunking communication. Finally, when the trunking call ends, the communication resource allocator deallocates the communication resource and removes the busy signal from its telephone line 205.

The present invention provides a method for a communication resource allocator .of a communication system to efficiently allocate both telephone resources and communication resources. With such a method, resource contention of the prior an are substantially eliminated by dividing the broadcast units into a first set and a second set. Broadcast units in the first set support both trunking communications and telephone communications, while broadcast units in the second set support only trunking communications. When a thinking call is received, the communication resource allocator allocates a communication resource from a broadcast unit in the second set, if a communication resource is available. If a communication resource is not available, the communication resource allocator allocates a communication resource from a broadcast unit in the first set. Thus, the broadcast units in the first set only support a trunking call when all of the broadcast units in the second set are busy and are therefore more readily available for telephone communications.

We claim:

1. In a trunking communication system that includes a plurality of communication units, a telephone resource allocator, a plurality of telephone resources, a limited number of communication resources, a plurality of broadcast units, and a communication resource allocator, wherein the plurality of broadcast units includes a predetermined first set of broadcast units and a predetermined second set of broadcast units, and wherein each broadcast unit in the predetermined first set of broadcast units is operably coupled to a telephone resource of the plurality of telephone resources, a method for allocating the telephone resources and the communication resources, the method comprises the steps of:
   a) receiving, by the communication resource allocator, a resource request from a requesting source;
   b) determining, by the communication resource allocator, whether the resource request contains a request for a telephone resource or a communication resource;
   c) when the resource request contains a request for a communication resource, allocating, by the communication resource allocator, a communication resource of a broadcast unit of the predetermined second set of broadcast units to the requesting source when the broadcast unit of the predetermined second set of broadcast units has an available communication resource; and
   d) when the broadcast unit of the predetermined second set of broadcast units does not have an available communication resource, allocating, by the communication resource allocator, a communication resource of a broadcast unit of the predetermined first set of broadcast units in a first predetermined order when the broadcast unit of the predetermined first set of broadcast units has an available communication resource and is not supporting a telephone communication.

2. The method of claim 1 further comprises the step of:
   e) when the requesting source is a communication unit and the resource request contains a telephone resource request, allocating, by the communication resource allocator, a telephone resource of a broadcast unit of the predetermined first set of broadcast units in the first predetermined order when the broadcast unit of the predetermined first set of broadcast units has an available telephone resource.

3. The method of claim 1 further comprises the step of:
   e) when the requesting source is a landline telephone user and the resource request contains a telephone resource request, allocating, by the telephone resource allocator, a telephone resource of the predetermined first set of broadcast units in a second predetermined order when the broadcast unit of the predetermined first set of broadcast units has an available telephone resource.

4. In the method of claim 2, the allocation of the telephone resource in a second predetermined order, and the allocation of a communication resource in the first predetermined order, wherein the first predetermined order derives from the second predetermined order, further comprises, arranging the first predetermined order and the second predetermined order to minimize contention of the broadcast unit in the predetermined first set of broadcast units between a communication unit telephone request and a landline user request.

5. In the method of claim 1, step (d) further comprises, providing, by the broadcast unit of the predetermined first set of broadcast units, a telephone busy signal to the operably coupled telephone resource when the broadcast unit is supporting a trunking communication via the communication that was allocated.

6. In the method of claim 3, the allocation of the telephone resource in the second predetermined order further comprises arranging the second predetermined order in a sequential pattern such that if a telephone resource is supporting a communication or is not answering after a programmed number of rings, the telephone resource signals by ringing the next telephone resource programmed in the sequential pattern, wherein the sequential pattern is repeated until the telephone resource becomes available.

7. In a trunking communication system that includes a plurality of communication units, a telephone resource allocator, a plurality of telephone resources, a limited number of communication resources, a plurality of broadcast units, and a communication resource allocator, wherein the plurality of broadcast units transceive the limited number of communication resources, wherein the plurality of broadcast units includes a predetermined first set of broadcast units and a predetermined second set of broadcast units, and wherein each broadcast unit in the predetermined first set of broadcast units is operably coupled to a telephone resource of the plurality of telephone resources, a method for allocating the telephone resources and the communication resources, the method comprises the steps of:

a) receiving, by the communication resource allocator, a resource request, wherein the resource request include a request for a communication resource;

b) allocating, by the communication resource allocator, a communication resource of a broadcast unit of the predetermined second set of broadcast units to the requesting source when the broadcast unit of the predetermined second set of broadcast units has an available communication resource; and c) when the broadcast unit of the predetermined second set of broadcast units does not have an available communication resource, allocating, by the communication resource allocator, a communication resource of a broadcast unit of the predetermined first set of broadcast units in a first predetermined order when the broadcast unit of the predetermined first set of broadcast units has an available communication resource and is not supporting a telephone communication.

8. The method of claim 7 further comprises the step of:

d) when the resource request is from a communication unit and includes a telephone resource request, allocating, by the communication resource allocator, a telephone resource of a broadcast unit of the predetermined first set of broadcast units in the first predetermined order when the broadcast unit of the predetermined first set of broadcast units has an available telephone resource.

9. The method of claim 7 further comprises the step of:

d) when the resource request is from a landline telephone user and contains a telephone resource request, allocating, by the telephone resource allocator, a telephone resource of the predetermined first set of broadcast units in a second predetermined order when the broadcast unit of the predetermined first set of broadcast units has an available telephone resource.

10. In the method of claim 8, the allocation of the telephone resource in a second predetermined order, and the allocation of a communication resource in the first predetermined order, wherein the first predetermined order derives from the second predetermined order, further comprises, arranging the first predetermined order and the second predetermined order to minimize contention of the broadcast unit in the predetermined first set of broadcast units between a communication unit telephone request and a landline user request.

11. In the method of claim 7, step (c) further comprises, providing, by the broadcast unit of the predetermined first set of broadcast units, a telephone busy signal to the operably coupled telephone resource when the broadcast unit is supporting a trunking communication via the communication that was allocated.

12. In the method of claim 9, the allocation of the telephone resource in the second predetermined order further comprises arranging the second predetermined order in a sequential pattern such that if a telephone resource is supporting a communication or is not answering after a programmed number of rings, the telephone resource signals by ringing the next telephone resource programmed in the sequential pattern, wherein the sequential pattern is repeated until the telephone resource becomes available.

* * * * *